US008175564B2

(12) United States Patent
Saito

(10) Patent No.: US 8,175,564 B2
(45) Date of Patent: May 8, 2012

(54) WIRELESS COMMUNICATION APPARATUS AND METHOD OF SELECTING ANTENNA THEREOF

(75) Inventor: Katsuo Saito, Yokohama (JP)

(73) Assignee: Canon Kabushiki Kaisha (JP)

( * ) Notice: Subject to any disclaimer, the term of this patent is extended or adjusted under 35 U.S.C. 154(b) by 380 days.

(21) Appl. No.: 12/502,376

(22) Filed: Jul. 14, 2009

(65) Prior Publication Data

US 2010/0009638 A1 Jan. 14, 2010

(30) Foreign Application Priority Data

Jul. 14, 2008 (JP) ................................ 2008-183020

(51) Int. Cl.
*H04B 1/06* (2006.01)
*H04B 7/00* (2006.01)

(52) U.S. Cl. .................. 455/277.1; 455/114.2; 343/876

(58) Field of Classification Search ............... 455/114.2, 455/129, 121, 101, 123, 272, 273, 275, 276.1, 455/277.1–279.1; 343/776, 777, 876
See application file for complete search history.

(56) References Cited

U.S. PATENT DOCUMENTS

2004/0053582 A1* 3/2004 Nakanishi et al. ............ 455/101
2005/0280572 A1* 12/2005 Shima ............................ 342/70

* cited by examiner

*Primary Examiner* — Christian Hannon
(74) *Attorney, Agent, or Firm* — Rossi, Kimms & McDowell LLP

(57) ABSTRACT

In a wireless communication apparatus for communicating by using a plurality of antennas, a degree of coupling between antennas is detected before communication is initiated, a combination of antennas is selected based on the degree of coupling and communication is executed using the selected antennas.

15 Claims, 7 Drawing Sheets

WIRELESS COMMUNICATION APPARATUS AND METHOD OF SELECTING ANTENNA THEREOF

BACKGROUND OF THE INVENTION

1. Field of the Invention

The present invention relates to a wireless communication apparatus having a plurality of antennas and a method of selecting an antenna thereof.

2. Description of the Related Arts

In recent years, wireless LANs using the IEEE 802.11 series of wireless communication standards have become popular and technologies to realize higher data transmission speed have been developed. One particular wireless communication technique for realizing wide band communication and increasing the efficiency of frequency utilization, MIMO (Multiple-Input Multiple-Output), is now attracting attention; it is being standardized and is scheduled to be adopted in IEEE 802.11n specification.

In MIMO communication, both transmitting and receiving sides have a plurality of antennas, and using a plurality of paths (transmission paths) that each path is unique, the transmitting side transmits a plurality of data simultaneously multiplexed on the same frequency (a technique known as space-division multiplexing).

As stated above, data transmission using space-division multiplexing via a plurality of antennas can realize an increase of transmission rate without an increase in frequency band usage.

When information is repeatedly transmitted via a plurality of unique transmission paths, reliability may be improved without an increase in the data transmission rate.

Here data transmitted from a plurality of antennas reaches the receiving side via different respective transmission channels.

In MIMO communications, to obtain a high transmission characteristic, correlation among a plurality of transmission channels must be low. One of the factors preventing low correlation among a plurality of transmission channels is coupling among a plurality of antennas. Here, the degree (amount) of coupling is a value representing what portion of a signal transmitted from an antenna A is absorbed by another antenna B.

At present, wireless LAN products executing MIMO communication are appearing; in most of them, the mounting area of their antennas, particularly in products such as access points, is relatively large.

An example in which a plurality of antennas are mounted in a wireless communication apparatus having a relatively large mounting area, such as access point of a wireless LAN, will now be explained.

FIG. 1 shows an example in which a plurality of antennas is mounted in an access point of a wireless LAN. In FIG. 1, Reference numeral 100 represents an access point, 101 through 103 are dipole antennas used in MIMO communication. In order to minimize the degree of coupling among respective antennas, the mounting distance between antennas 101 through 103 is set to be longer than one half of one wavelength. As stated above, as the distance between antennas increases, the degree of coupling between antennas decreases; by keeping the mounting distance between antennas to be about one half of one wavelength, the correlation between transmission channels can be treated to be zero under multiple path data transmission.

FIG. 2 shows an example in which a plurality of antennas is mounted in a wireless card module. In case of a wireless card module connected to a notebook-type personal computer, antennas are mounted in a relatively small area compared with the case of antennas mounted on an access point.

In FIG. 2, reference numeral 200 represents a notebook-type personal computer; 201 represents a wireless card module; 202 and 203 represent print antenna patterns mounted on a wireless substrate by pattern printing.

The size of the substrate of a wireless card module 201 is too small to mount a plurality of antennas while maintaining a mounting distance between antennas 202 and 203 of about half of one wavelength. So, in order to minimize the degree of coupling between antennas, they are mounted such that their polarization surfaces are perpendicular to each other.

When constructed in this way, because the polarization surfaces of horizontal and vertical polarization are perpendicular to each other, even though the mounting distance is less than a half of one wavelength, it is possible to keep correlation between transmission channels small under conditions of large channel fading.

The layout method of a plurality of antennas according to the above prior art example is limited to cases where sufficient open space can be maintained in the peripheral area of the plurality of antennas so as not to affect the antenna characteristic (e.g., the input-output reflection characteristic, radiation characteristic).

Because the peripheral area is open space, the mounting distance can be sufficiently maintained and polarization surfaces can be selected to be perpendicular to each other, thereby minimizing the degree of coupling between antennas.

However, when a plurality of antennas is mounted in a small wireless apparatus, because sufficient free space cannot be maintained near the antennas due to the existence of plastic or metal material near them, it is difficult to apply the mounting method according to the prior art example described above.

FIG. 3 shows an example in which a plurality of antennas is mounted in a small wireless mobile terminal. As shown in FIG. 3, reference numeral 300 represents the enclosure of the small wireless mobile terminal; 301 through 306 represent small antennas such as a chip antenna and in this example, six antennas are mounted.

As shown in FIG. 3, when a plurality of antennas are mounted in the small wireless mobile terminal, a protruding antenna such as a rod antenna cannot be mounted due to design requirements or mechanical strength limitations. Accordingly, it is necessary to mount a plurality of antennas inside the apparatus, and therefore it is also necessary to mount the antennas close to the metal or plastic material in the small wireless mobile terminal.

If metal or plastic material exists near antenna, it is difficult to realize good antenna characteristics.

For example, it is possible that the directionality of the antenna is in a specific direction due to the metal material near the antenna or that the resonant frequency of the signal is made to deviate from that intended due to the plastic material.

Further, the orthogonal nature of the perpendicular surface cannot be maintained due to the metal material existing nearby.

Therefore, when a plurality of antennas is mounted in the small wireless mobile terminal, because the mounting distance between antennas cannot be kept longer than one half of a wavelength due to the small mounting enclosure, the degree of coupling between adjacent antennas becomes large.

Because MIMO communication executes communication via a plurality of antennas, if the degree of coupling between antennas is large, the basic conditions necessary for realizing optimum MIMO communication, that is, no correlation between respective streams, cannot be maintained.

Accordingly, it is difficult to realize the separation processing of respective streams in the receiving side causing a deterioration in BER and a loss of the high speed and reliability characteristics of MIMO.

Further, because the transmission power is lowered due to the coupling between transmission antennas, there are several disadvantages to these conditions such as a shortened communication distance or an increase in power consumption if the communication distance is maintained.

SUMMARY OF THE INVENTION

It is an object of the present invention to provide a wireless communication apparatus having a plurality of antennas and for selecting an antenna to be used in view of the coupling between antennas when the wireless communication apparatus executes communication.

According to an aspect of the present invention, there is provided a method of controlling a wireless communication apparatus having a plurality of antennas, comprising: a transmitting step of transmitting a reference signal sequentially from each of the plurality of antennas, a receiving step wherein each of the plurality of antennas receives the reference signal transmitted in the transmitting step, a determining step of determining a degree of coupling between each of the plurality of antennas based on a receiving result of the receiving step, and a selecting step of selecting antennas to be used for communication from among the plurality of antennas based on the result of the determining step.

According to another aspect of the present invention, there is provided a wireless communication apparatus having a plurality of antennas, comprising: a transmitting unit for transmitting a reference signal sequentially from each of the plurality of antennas, a receiving unit for receiving the reference signal transmitted from the transmitting unit by each of the plurality of antennas, a determining unit for determining the degree of coupling between each of the antennas based on the receiving result of the receiving unit, and a selecting unit for selecting the antenna used for communication among a plurality of antennas based on the determining result of the determining unit.

Further features of the present invention will become apparent from the following exemplary embodiments with reference to the attached drawings.

DESCRIPTION OF THE EMBODIMENTS

The preferred embodiments according to the present invention will now be described in detail with reference to the accompanying drawings.

Figure 4:
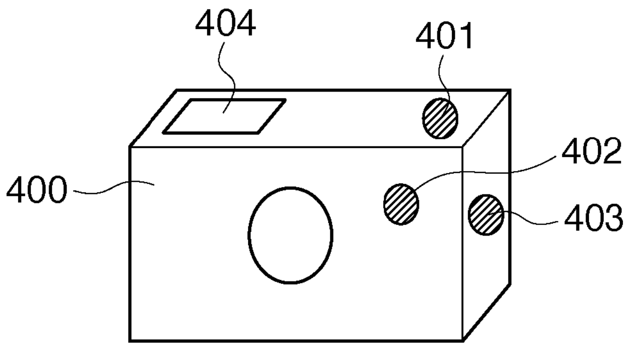
FIG. 4 is a diagram showing an example according to the present invention in which a plurality of antennas is mounted in a small wireless mobile terminal.

FIG. 4 is a diagram showing the layout of antennas according to an embodiment of the present invention when a plurality of antennas is mounted in a small wireless mobile terminal.

In FIG. 4, reference numeral 400 represents the general shape of the small wireless mobile terminal, such as an image capture apparatus; reference numerals 401 through 403 represent small chip antennas mounted in an enclosure of the image capture apparatus, 404 is a display unit for performing user notification.

When the antennas are mounted inside of the apparatus, the radiation pattern of a plurality of antennas becomes complicated because it is affected by metal material near the antennas.

Further, in the case of a small image capture apparatus carried by a human, the radiation pattern is changed by the effect of human hands being in the vicinity of the antennas.

Figure 5:
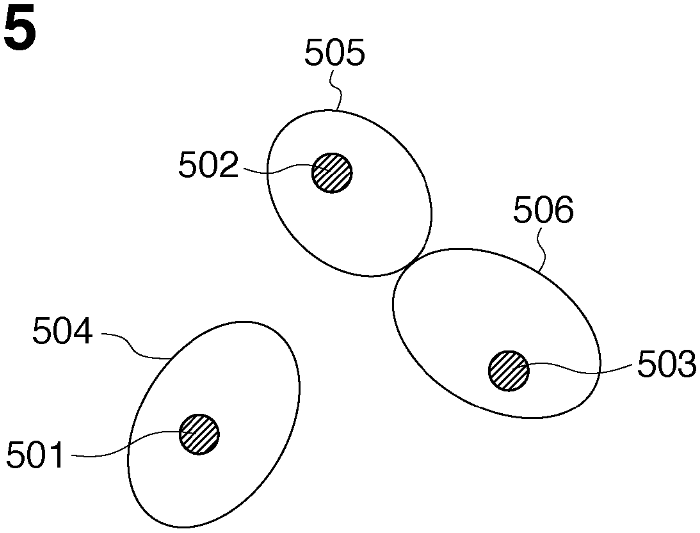
FIG. 5 is a diagram showing the directionality of each antenna conceptually when a plurality of antennas is mounted in a small wireless mobile terminal.

FIG. 5 conceptually depicts the directionality of each antenna when a plurality of antennas are mounted in the small wireless terminal; 501 through 503 represent respective antennas; 504 represents an overview of the directionality of the antenna 501; 505 represents an overview of the directionality of the antenna 502; and 506 represents an overview of the directionality of the antenna 503.

In the state shown in FIG. 5, the directionalities of antennas 502 and 503 are such that they face each other and the directionalities of antennas 502 and 503 have a different direction relative to the antenna 501. For purposes of explanation, these patterns have been simplified; actual directive patterns of respective antenna would not be as simple as those depicted here. It can be assumed that the degree of coupling between the antennas 502 and 503 is the strongest as they have same directionality.

It can be also assumed that the degree of coupling between the antenna 501 and antennas 502 and 503 is weak because their directionalities are different.

In order to detect the degree of coupling among these 3 antennas, a reference signal is transmitted time sequentially from each antenna.

One antenna receives the reference signal transmitted from another antenna and the signal level of the reference signal is detected and noted.

When the transmission of the reference signal from the three antennas is finished, the degree of coupling between them can be detected by comparing the signal level of the signal received by each antenna.

The method of determining the degree of coupling between antennas will be explained hereinafter in detail.

Figure 6:
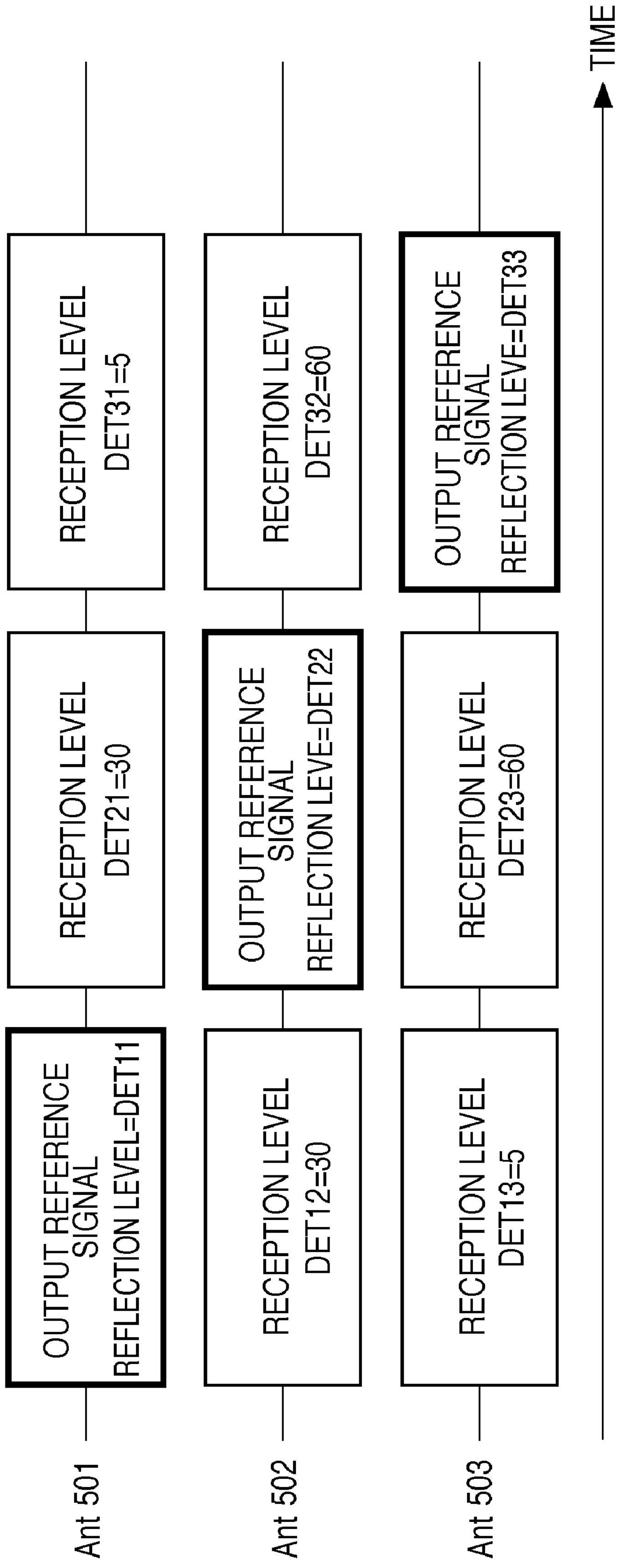
FIG. 6 is a diagram showing a transmission timing of a reference signal according to the present invention.

FIG. 6 is a diagram showing the transmission timing of the reference signal according to an embodiment of the present invention.

In the previous step, before communication is initiated, the reference signal is transmitted from antenna 501. The other antennas 502 and 503 receive the reference signal transmitted from antenna 501 and the signal levels of the received signals are stored in memory, not shown, respectively as DET12 and DET13.

The formula DET12=30 means that the received signal level of the reference signal transmitted from the antenna 501 and received by the antenna 502 is 30, and the formula DET13=5 means that the received signal level of the reference signal transmitted from the antenna 501 and received by the antenna 503 is five.

When the reference signal is transmitted from the antenna 501, the signal level of the signal reflected by the antenna is detected and stored in a memory not shown as DET11 (hereinafter called reflection level).

Next, the reference signal is transmitted from the antenna 502. The other antennas 501 and 503 receive the reference signal transmitted from the antenna 502 and each of the signal levels are stored in a memory (not shown).

The formula DET21=30 means that the signal level of the reference signal transmitted from the antenna 502 and received by the antenna 501 is 30, the formula DET23=60 means that the signal level of the reference signal transmitted from the antenna 502 and received by the antenna 503 is 60.

When the reference signal is transmitted from the antenna 502, the level of the signal reflected by the antenna 502 is stored in a memory (not shown) as DET22. Similarly, the reference signal is transmitted from the antenna 503.

The other antennas 501 and 502 receive the reference signal transmitted from the antenna 503 and the received signal levels are respectively stored in a memory (not shown).

The formula DET31=5 means that the signal level of the reference signal transmitted from the antenna 503 and received by the antenna 501 is five and the formula DET32=60 means that the signal level of the reference signal transmitted from the antenna 503 and received by the antenna 502 is 60.

When the reference signal is transmitted from the antenna 503, the level of the signal reflected by the antenna 503 is stored in a memory (not shown) as DET33. The levels of the received signal DET12 and DET21 are substantially same if the circumstance between antennas is not immediately changed.

Similarly, the signal levels of the received pairs of signals DET23, DET32 and DET13, DET31 are substantially same.

It is known that the lowest received signal level among the three antennas is DET13 when the reference signal is transmitted from the antenna 501 and received by the antenna 503, and DET31 when the reference signal is transmitted from the antenna 503 and received by the antenna 501.

Accordingly, it is determined that the combination of the antennas 501 and 503 has the lowest degree of coupling among the three antennas; this combination is selected and communication is initiated. Here, when each antenna transmits the reference signal, if there is an antenna from which the signal is reflected and the reflection level is higher than the preset level (Threshold Level DETth), said antenna is not selected. Further, if there are two antennas, the reflection level of which is higher than the threshold level, the remaining antenna is used and communication is initiated.

If there are three antennas, the reflection level of which is higher than the threshold level, it is waited a predetermined amount of time passes and again each antenna transmits the reference signal sequentially, and antenna selection is similarly executed by detecting the received and reflection levels.

If, after carrying out further measurements, there are still three antennas the reflection level of which is higher than the threshold level, the user is notified that initiation of communication has been suspended and communication cannot be initiated.

User notification is executed by displaying a warning message on a display unit 404 provided in the enclosure of the image capture apparatus 400.

Figure 7:
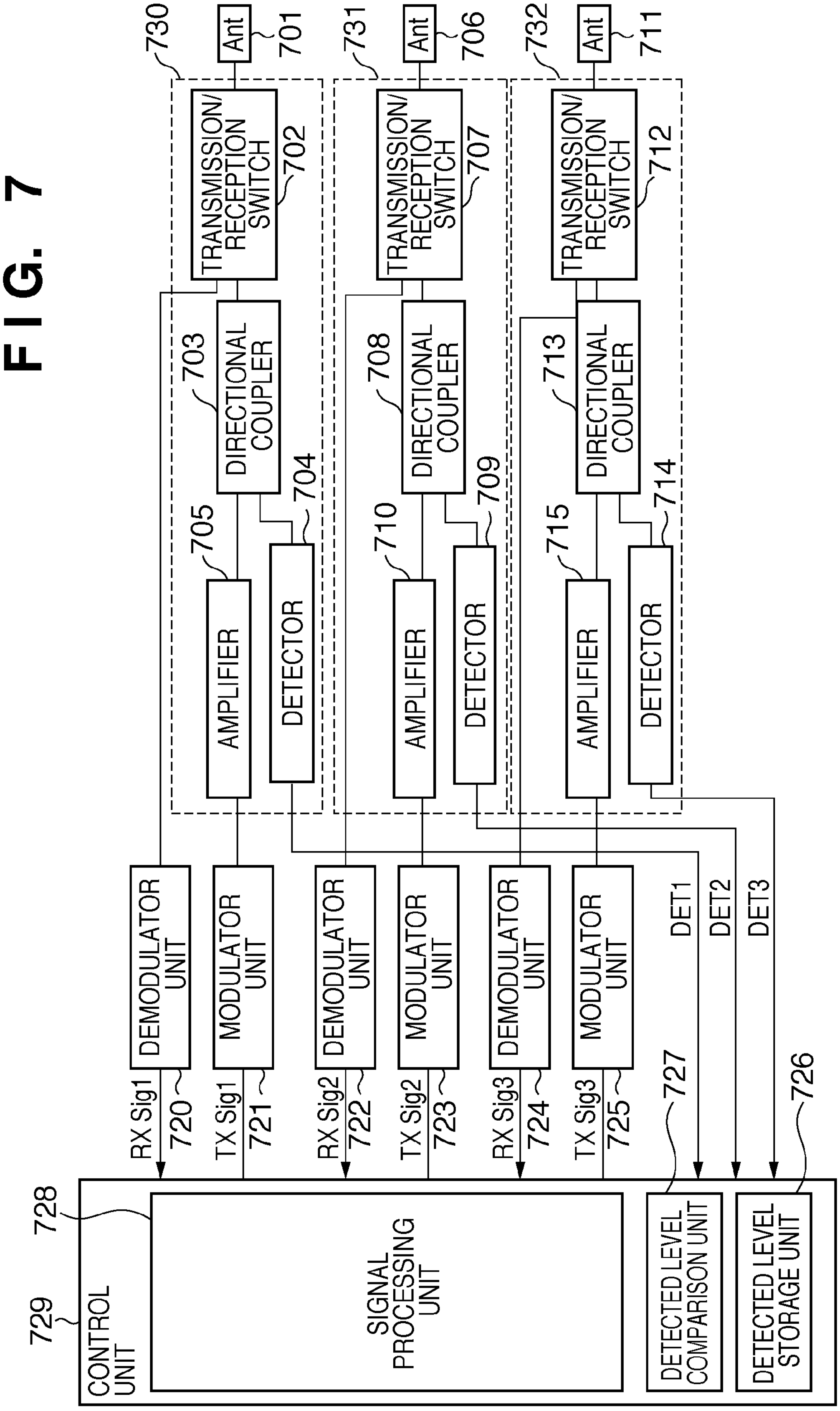
FIG. 7 is a block diagram of a detector for detecting the degree of coupling between antennas according to an embodiment of the present invention.

FIG. 7 is a diagram showing an example of a determination unit for determining (measuring) the degree of coupling between pluralities of antennas according to an embodiment of the present invention.

In this example, as shown in FIG. 7, the degree of coupling is detected by a wireless RF unit.

To transmit the reference signal from an antenna 701 in order to measure the degree of coupling between the antennas, a control unit 729 transmits a reference signal as TXSig1 before communication is initiated. The transmitted signal TXSig1 is modulated by a modulator 721 and supplied to a directional coupler 703 after being amplified by an amplifier 705.

Then, this signal is supplied to a transmission/reception switch 702, which switches between receiving and transmitting and is controlled by a switching signal, the switch switches to a transmission mode, the signal is then further supplied to the antenna 701 and radiated to the air.

When there is a reflection of the reference signal by the antenna 701, the reflected signal is supplied to the directional coupler 703 through the transmission/reception switch 702.

The reflected signal supplied to the directional coupler 703 is supplied to a detector 704, is detected therein and stored in a detected level storage unit 726 of a control unit 729 as a voltage level (DET1).

When reference signals TXSig2 and TXSig3, which are transmitted from the antennas 706 and 711, are received, the transmission/reception switch 702 is switched to receiving operation mode by a switching signal (not shown).

In this state, the reference signals TXSig2 and TXSig3 are supplied to the transmission/reception switch 702 and further supplied to the directional coupler 703 and a portion of the level is supplied to the detector 704.

Detection processing is then carried out by the detector 704 and each detection result is stored as a voltage level (DET1) in the detected level storage unit 726 of the control unit 729.

Here, the signal TXSig1 is a reference signal before communication is initiated, but once communication is initiated, it is normal transmission data.

RXSig1 is a received data signal from the antenna 701 and is demodulated by a demodulator 720.

Similarly, for transmitting the reference signal from antenna 706 to measure the degree of coupling between the antennas, the control unit 729 transmits a reference signal as TXSig2 before communication is initiated.

The transmitted signal TXSig2 is modulated by a modulator 723 and supplied to a directional coupler 708 after being amplified by an amplifier 710.

Then, this signal is supplied to a transmission/reception switch 707, which switches between receiving and transmitting modes and is controlled by a switching signal (not shown), the switch switches to a transmission mode, the signal is further supplied to the antenna 706 and radiated to the air.

When there is a reflection of the reference signal by the antenna 706, the reflected signal is also stored in a detected level storage unit 726 of a control unit 729 as a voltage level (DET2) similar to the reflected signal from the antenna 701.

When reference signals TXSig1 and TXSig3, which are transmitted from the other antennas 701 and 711, are received, the transmission/reception switch 707 switched to receiving operation mode by a switching signal (not shown).

In this state, reference signals TXSig1 and TXSig3 are supplied to the transmission/reception switch 707 and further supplied to the directional coupler 708 and a fixed amount of the level is supplied to the detector 709.

Detection processing is executed by the detector 709 and the result is stored in the detected level storage unit 726 of the control unit 729 as the voltage level (DET2).

Here, the signal TXSig2 is a reference signal before communication is initiated, but once communication is initiated, it is normal transmission data.

The signal RXSig2 is a received data signal from antenna 706 and is demodulated by a demodulator 722.

Further similarly, for transmitting the reference signal from antenna 711 to measure the degree of coupling between the antennas, a control unit 729 transmits a reference signal as TXSig3 before communication is initiated. The transmitted signal TXSig3 is modulated by a modulator 725 and supplied to a directional coupler 713 after being amplified by an amplifier 715.

Then, this signal is supplied to a transmission/reception switch 712, which switches between receiving and transmitting modes and is controlled by a switching signal (not shown), the switch switches to a transmitting mode, the signal is further supplied to the antenna 711 and radiated to the air.

When there is a reflection of the reference signal by the antenna 711, the reflected signal is also stored in the detected level storage unit 726 of the control unit 729 as a voltage level (DET3), similar to the reflected signal from antenna 701.

When reference signals TXSig1 and TXSig2, which are transmitted from the other antennas 701 and 706, are received, the transmission/reception switch 712 is switched to receiving operation mode by a switching signal (not shown).

In this state, the reference signals TXSig1 and TXSig2 are supplied to the transmission/reception switch 712 and further supplied to the directional coupler 713 and a portion of the level is supplied to the detector 714.

Detection processing is executed in the detector 714 and stored in the detected level storage unit 726 of the control unit 729 as the voltage level (DET3).

Here, signal TXSig3 is a reference signal before communication is initiated, but when communication is initiated, it is a normal transmission data; signal RXSig3 is a received data signal from antenna 711 and is demodulated by a demodulator 724.

As stated above, the voltage levels DET1, DET2 and DET3 received by antennas 701, 706 and 711 respectively and detected are stored in the detected level storage unit 726 of the control unit 729.

In the next step, detected level comparing unit 727 compares voltage levels DET1, DET2 and DET3 stored in storage unit 726 and the pair of transmitting and receiving antennas having the minimum voltage level is selected. When communication is initiated, transmitting and receiving are executed using the selected combination of antennas.

For example, in the example shown in FIG. 6, the combination having the minimum reception level among three antennas is DET13=5 and DET31=5; antennas then used in communication are 701 and 711, as shown in FIG. 7.

When communication is initiated, the same or different transmission data may be transmitted simultaneously from the antennas 701 and 711. The data TXSig1 transmitted from the control unit 729 is amplified by an amplifier 705 at a desired gain, is supplied to the transmission/reception switch 702 through the directional coupler 703 and is then radiated to the air via the antenna 701.

The data TXSig3 transmitted from the control unit 729 is amplified by an amplifier 715 at a desired gain, is supplied to the transmission/reception switch 712 through the directional coupler 713 and is then radiated to the air via the antenna 711.

Reference numeral 728 represents a signal processing unit and predetermined signal processing is executed on data received and data to be transmitted.

Reference numeral 730 represents a first wireless RF unit; 731 is a second wireless RF unit; 732 is a third wireless RF unit.

Figure 8A:
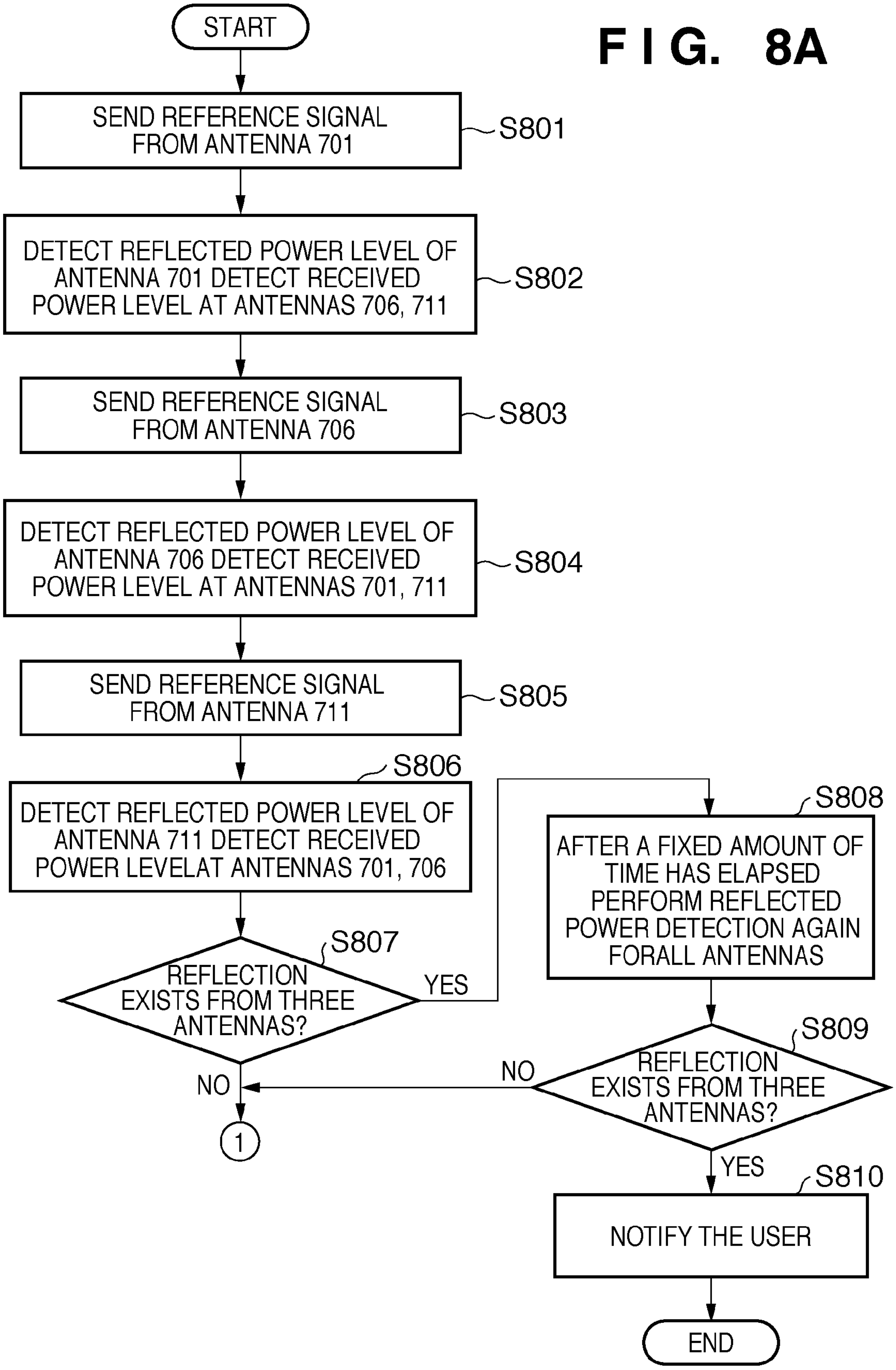
FIGS. 8A and 8B are flow charts showing antenna selection processing according to an embodiment of the present invention.
Figure 8B:
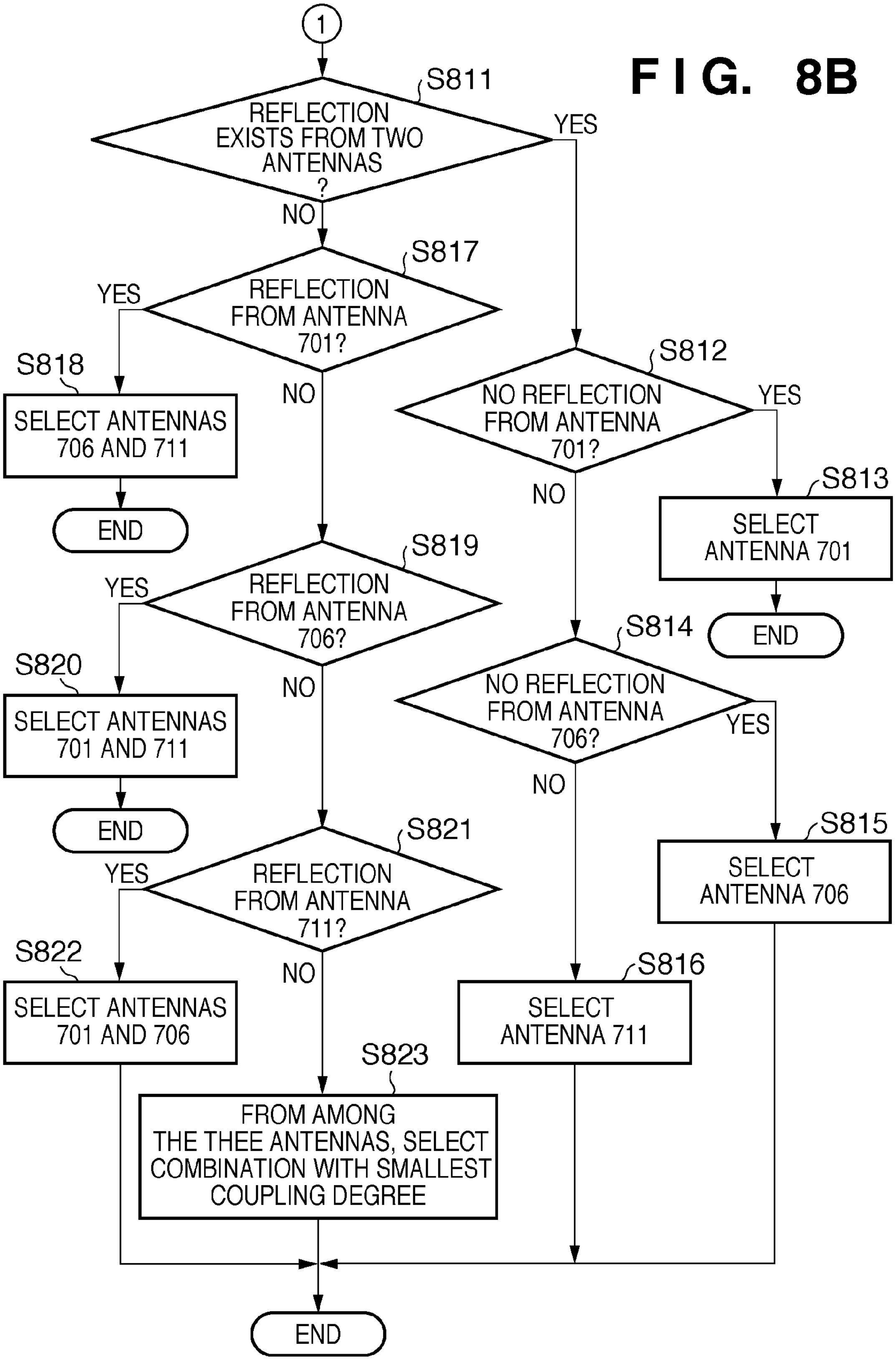

FIGS. 8A and 8B are flow charts showing antenna selection processing according to the present embodiment.

As stated above, in step S801, the reference signal is transmitted from the antenna 701.

In step S802, the reflection level of the reference signal transmitted from antenna 701 is detected; simultaneously, the other antennas 706 and 711 receive the reference signal transmitted from the antenna 701 and the reception level is stored in the detected level storage unit 726.

In step S803, the reference signal is transmitted from the antenna 706; in step S804, the reflection level of the reference signal transmitted from the antenna 706 is detected; simultaneously, the other antennas 701 and 711 receive the reference signal transmitted from the antenna 706 and the reception level is stored in the detected level storage unit 726. In step S805, the reference signal is transmitted from the antenna 711; in step S806, the reflection level of the reference signal transmitted from the antenna 711 is detected; simultaneously, the other antennas 701 and 706 receive the reference signal transmitted from the antenna 711 and the reception level is stored in the detected level storage unit 726.

In step S807, a reflection level of the reference signal is compared with the threshold level in detected level comparison unit 727 to determine whether there is a reflection from three antennas 701, 706 and 711.

Here, if the reflection levels from all antennas are higher than the threshold level, it is determined that there is a reflection and the processing proceeds to a step S808.

In step S808, after a predetermined time period, the processing of steps S801 through S806 are performed again and the reflection levels from all antennas are detected. In the following explanation, whether or not there is a reflection from each antenna is determined by whether or not the reflection level is higher than the threshold level.

Next, in step S809, as in step S807, if it is determined that there are reflections from all antennas (Yes), processing proceeds to step S810. In step S810, a warning is provided to the user indicating that communication is not possible.

However, if No is determined in step S807, processing proceeds to step S811 and it is determined whether there is a reflection from two antennas. If it is determined in step S811 that there is a reflection from two antennas (Yes), processing proceeds to step S812.

In step S812, in order to specify antennas with no reflection, it is determined if there is a reflection from the antenna 701.

If it is determined that there is no reflection, processing proceeds to step S813 and only antenna 701 is selected for transmitting and receiving. In step S812, if it is determined that there is reflection from the antenna 701, processing proceeds to step S814 and it is determined whether or not there is a reflection from the antenna 706.

If it is determined that there is no reflection, processing proceeds to step S815 and the antenna 706 is selected for transmitting and receiving.

If it is determined that there is reflection, then it must be that the only antenna without reflection is the antenna 711, so processing proceeds to step S816 and the antenna 711 is selected for transmitting and receiving.

If No is determined in step S811, processing proceeds to step S817 to specify the two antennas with no reflection and it is determined whether or not there is reflection from the antenna 701.

Here, if it is determined that there is reflection, processing proceeds to step S818 and the antennas 706 and 711 are selected for transmitting and receiving.

In step S817, if it is determined that there is no reflection from the antenna 701, processing proceeds to step S819 and it is determined whether or not there is reflection from the antenna 706.

Here, if it is determined that there is reflection, processing proceeds to step S820 and the antennas 701 and 711 are selected for transmitting and receiving.

In step S819, if it is determined that there is no reflection from the antenna 706, processing proceeds to step S821 and it is determined whether or not there is the reflection from the antenna 711.

Here, if it is determined that there is reflection, processing proceeds to step S822 and the antennas 701 and 706 are selected for transmitting and receiving.

In step S821, if it is determined that there is no reflection from the antenna 711, it is finally determined that there is no reflection from any of the antennas and processing proceeds to step S823.

In step S823, the combination of antennas having the minimum coupling is selected and used for transmitting and receiving.

According to this embodiment, when communication is executed using a plurality of antennas, the combination of antennas having the minimum coupling between antennas can be selected.

While it has been explained in this embodiment that two of the three antennas having lowest coupling are selected, if it is determined that the coupling among the three antennas is lower than the threshold value, all three antennas may be used.

Further, according to this embodiment, an example wherein three antennas are used is explained but it goes without saying that the present invention can be applied to an example in which four antennas are used.

In this case, the receiving level and the reflection level are detected and the combination of two antennas having the lowest degree of coupling can be selected among the antennas having a reflection level lower than the threshold level.

In this case, a combination of only two antennas having the lowest degree of coupling may be selected; moreover, a combination of three and more antennas having a degree of coupling lower than the threshold level may also be selected.

Other Embodiment

Next, another embodiment according to the present invention will be explained in detail with reference to the accompanying drawings.

In this embodiment, by increasing the number of antennas, two antennas for each high frequency portion are mounted and communication is carried out by switching between two antennas using an antenna switch SW.

Figure 1:
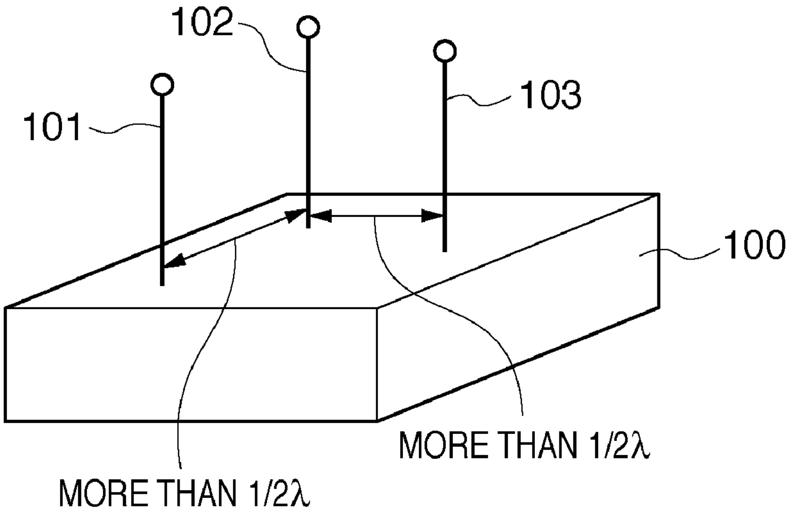
FIG. 1 is a diagram showing an example in which a plurality of antennas is mounted in an access point of wireless LAN.
Figure 2:
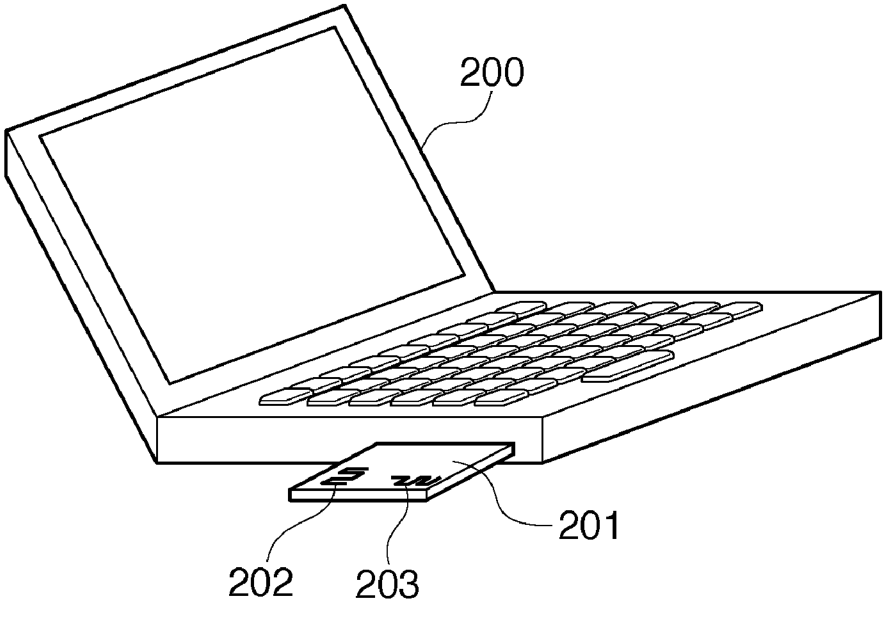
FIG. 2 is a diagram showing an example in which a plurality of antennas is mounted in a wireless card module.
Figure 3:
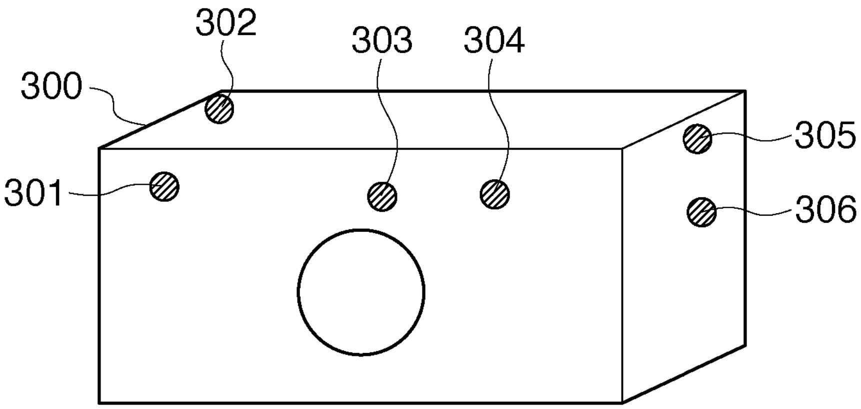
FIG. 3 is a diagram showing an example in which a plurality of antennas is mounted in a small wireless mobile terminal.

For example, when antennas 301 through 306 are mounted in a small wireless terminal 300 as shown in FIG. 3, the degree of coupling between antennas is detected.

Figure 9:
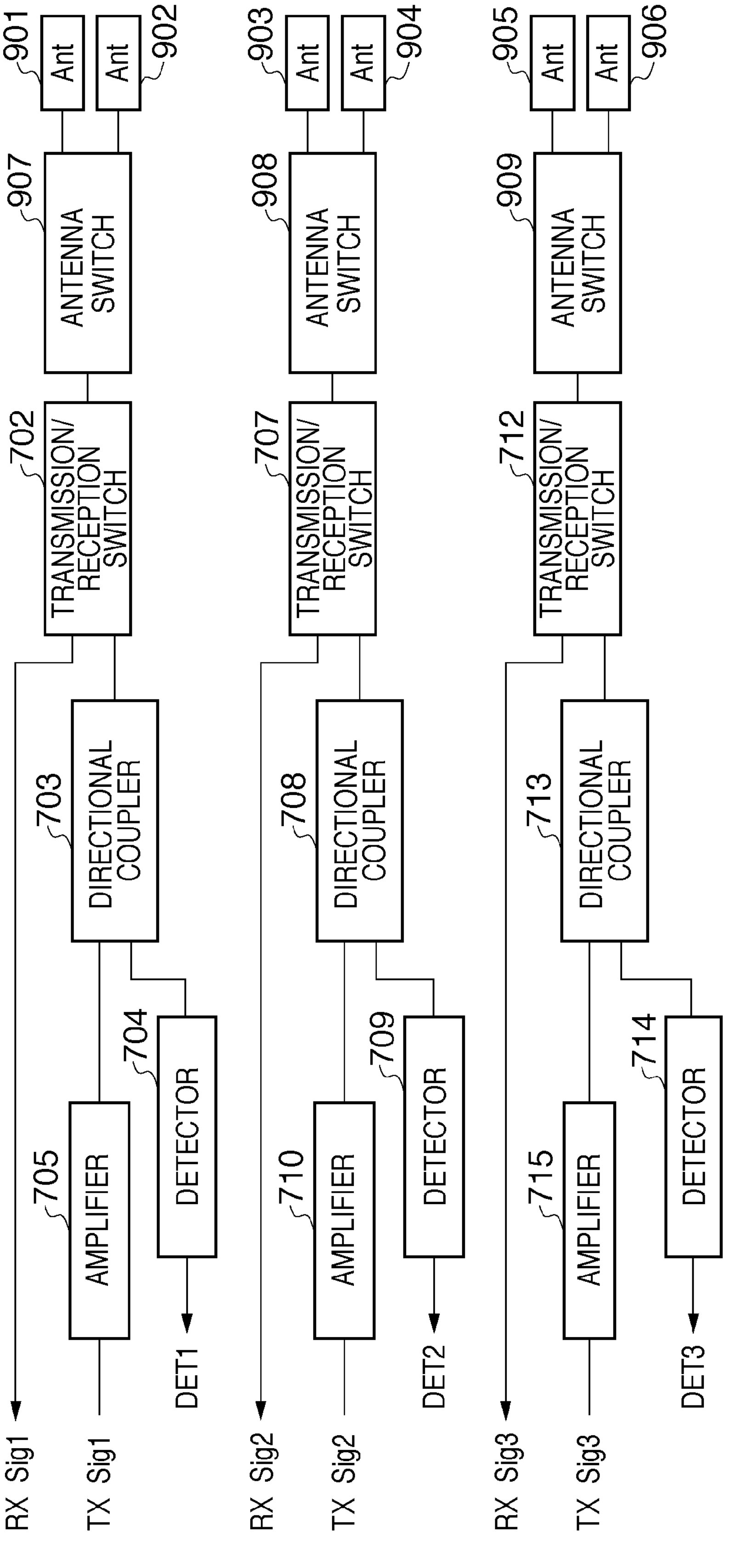
FIG. 9 is a block diagram showing a detector for detecting the degree of coupling between antennas according to another embodiment of the present invention.

FIG. 9 is a chart showing the structure of the detector for detecting the degree of the coupling between antennas in this embodiment.

Reference numerals 901 and 902 represent antennas and are switched by antenna switch 907.

Reference numerals 903 and 904 represent antennas and are switched by an antenna switch 908.

Reference numerals 905 and 906 represent antennas and are switched by an antenna switch 909.

Other features of the figure are the same as that of FIG. 7 and further explanation will be omitted.

In the structure above, when the reference signal is transmitted from each antenna before communication is initiated, two antennas are switched by an antenna switching signal (not shown) and operation similar to that of FIG. 7 is carried out.

As a result of execution of operations similar to that of FIG. 7, the combination of antennas having the lowest degree of coupling among the six antennas is selected and used for transmitting and receiving.

The present invention can be applied to both a system having a plurality of apparatuses (for example a host computer, interface apparatus, reader, or printer) and an apparatus having only one device (for example a copy machine or a facsimile).

Further, recording media storing program code that realizes the functions of the above embodiments is supplied to the system or apparatus and the computer (CPU or MPU) reads out the program stored in the recording media and executes the program.

It goes without saying that by this execution, the object of the present invention is achieved. In this case, the program code itself, read out from the recording media by the computer, realizes the functions of the above embodiment, so, the recording media storing the program code embodies the present invention.

As the recording media supplying the program code, for example, a flexible disc, a hard disc, an optical disc, an optical magnetic disc, CD-ROM, CD-R, a magnetic tape, a nonvolatile memory card or ROM may be used.

Besides the case whereby the above functions of the embodiments of the present invention are realized by executing the read out program code, needless to say, the present invention also includes cases wherein an Operating System (OS) running on the computer executes a part or all of the actual processing and by this processing, the functions of either of the above embodiments is realized.

Furthermore, it goes without saying that the present invention also includes cases wherein the program code read out from the recording media is stored in a memory located on a function extension board inserted in the computer or in a function extension unit connected to the computer, and, based on the instructions of the program code, the CPU located on the function extension board or unit executes a part or all of the actual processing and by this processing, the functions of either of the above embodiments is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions This application claims the benefit of Japanese Patent Application No. 2008-183020, filed Jul. 14, 2008, which is hereby incorporated by reference herein its entirety.

What is claimed is:

1. A method of controlling a wireless communication apparatus having three or more antennas, comprising:

a transmitting step of transmitting a signal from each of the three or more antennas, a receiving step of receiving the signal transmitted in said transmitting step by each of the three or more antennas, wherein the signal is received by other different antennas from the antenna which transmitted the signal, a determining step of determining a degree of coupling between each of the three or more antennas based on a receiving result of said receiving step, and a selecting step of selecting a combination of antennas used for space-division multiplexing communication from among the three or more antennas based on the degree of coupling between each of the three or more antennas determined in said determining step.

2. The method according to claim 1, wherein said determining step determines the degree of coupling between the antenna which transmitted the signal and the antenna which received the signal based on the receiving level of the signal received by each of the three or more antennas.

3. The method according to claim 1, further comprising a step of detecting a signal reflected from each of said antennas when the signal is transmitted from each of said antennas, and wherein said selecting step selects the combination of antennas used for the space-division multiplexing communication based on the degree of coupling determined in said determining step and the reflected signal detected in said detecting step.

4. The method according to claim 3, wherein said selecting step does not select one or more antennas having a reception level of the reflected signal higher than a predetermined threshold level.

5. The method according to claim 3, wherein when the reception levels of the reflected signal of all antennas are higher than a predetermined threshold level, a signal is retransmitted in said transmitting step and the reflected signal is detected in said detecting step.

6. A method of controlling a wireless communication apparatus having a plurality of antennas, comprising:

a transmitting step of transmitting a reference signal sequentially from each of said plurality of antennas, a receiving step wherein each of said plurality of antennas receives said reference signal transmitted in said transmitting step, a determining step of determining a degree of coupling between each of said plurality of antennas based on a receiving result of said receiving step, a detecting step of detecting a reflected signal reflected from each of said antennas when the reference signal is transmitted from each of said antennas, a selecting step of selecting antennas to be used for communication from among said plurality of antennas based on the result of said determining step, wherein said selecting step selects the antenna used for communication based on the degree of coupling determined in said determining step and the reflected signal detected in said detecting step, and a notifying step of notifying a user when the reception levels of the reflected signal of all antennas are higher than the predetermined threshold level.

7. The method according to claim 1, wherein said selecting step selects the combination of antennas having the lowest degree of coupling.

8. A wireless communication apparatus having three or more antennas, comprising:

a transmitting unit configured to transmit a signal from each of the three or more antennas, a receiving unit configured to receive the signal transmitted from said transmitting unit by each of the three or more antennas, wherein the signal is received by other different antennas from the antenna which transmitted the signal, a determining unit configured to determine the degree of coupling between each of the three or more antennas based on the receiving result of said receiving unit, and a selecting unit configured to select a combination of antennas used for space-division multiplexing communication among the three or more antennas based on the degree of coupling between each of the three or more antennas determined by said determining unit.

9. A non-transitory computer-readable storage medium for storing a program that, when executed by a computer, causes the computer to perform a method of controlling a wireless communication apparatus having three or more antennas, the method comprising:

a transmitting step of transmitting a signal from each of the three or more antennas, a receiving step of receiving the signal transmitted in said transmitting step by each of the three or more antennas, wherein the signal is received by other different antennas from the antenna which transmitted the signal, a determining step of determining a degree of coupling between each of the three or more antennas based on a receiving result of said receiving step, and a selecting step of selecting a combination of antennas used for space-division multiplexing communication from among the three or more antennas based on the degree of coupling between each of the three or more antennas determined in said determining step.

10. The apparatus according to claim 8, wherein said determining unit determines the degree of coupling between the antenna which transmitted the signal and the antenna which received the signal based on the receiving level of the signal received by each of the three or more antennas.

11. The apparatus according to claim 8, further comprising a detecting unit configured to detect a signal reflected from each of said antennas when the signal is transmitted from each of said antennas, and wherein said selecting unit selects the combination of antennas used for the space-division multiplexing communication based on the degree of coupling determined by said determining unit and the reflected signal detected by said detecting unit.

12. The apparatus according to claim 11, wherein said selecting unit does not select one or more antennas having a reception level of the reflected signal higher than a predetermined threshold level.

13. The apparatus according to claim 11, wherein when the reception levels of the reflected signal of all antennas are higher than a predetermined threshold level, a signal is retransmitted by said transmitting unit and the reflected signal is detected by said detecting unit.

14. The apparatus according to claim 11, further comprising a notifying unit configured to notify a user when the reception levels of the reflected signal of all antennas are higher than the predetermined threshold level.

15. The apparatus according to claim 8, wherein said selecting unit selects the combination of antennas having the lowest degree of coupling.

* * * * *